Sept. 6, 1932.    G. A. LYON    1,875,316
COVER FOR SPARE TIRES FOR AUTOMOBILES
Filed Oct. 27, 1928
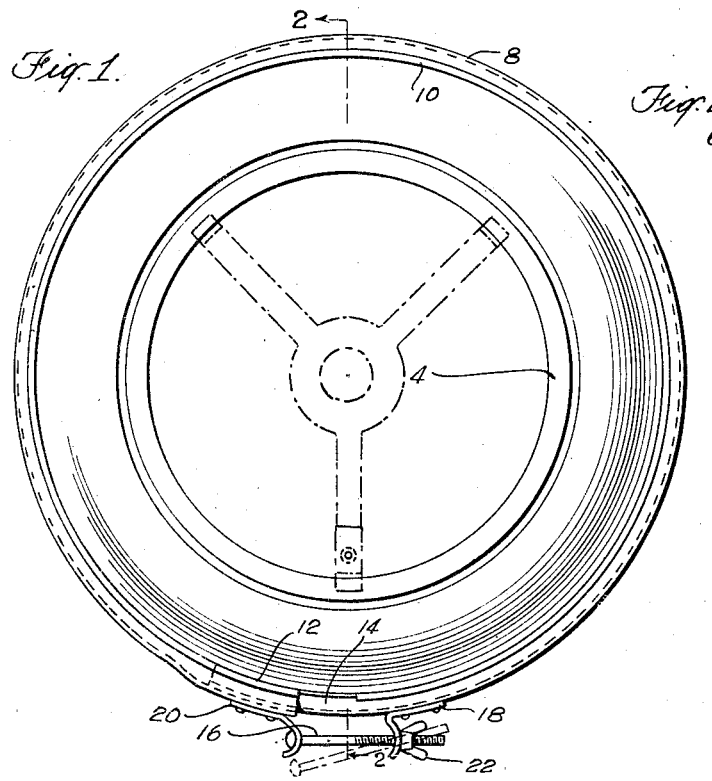
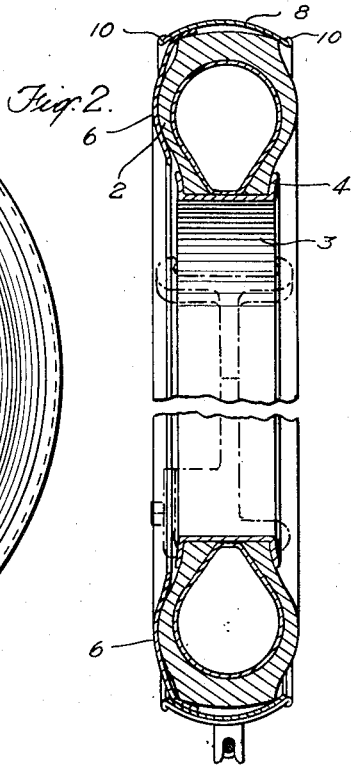
INVENTOR
GEORGE A. LYON
BY
ATTORNEYS Patented Sept. 6, 1932

1,875,316

UNITED STATES PATENT OFFICE

GEORGE ALBERT LYON, OF ALLENHURST, NEW JERSEY

COVER FOR SPARE TIRES FOR AUTOMOBILES

Application filed October 27, 1928. Serial No. 315,455.

This invention relates to covers for spare tires carried upon automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings often cannot be applied to a tire so that they will fit the tire smoothly. They also wear out quickly and are readily torn, particularly when struck by another car, as often happens in congested traffic conditions. Such covers do not constitute a satisfactory protection for the tire against damage in case of collision. The ordinary tire cover, since it is made of highly flexible material, not only wrinkles readily, but when applied to a tire, conforms to the projections and depressions on a tire so that it does not present a smooth outer surface.

The principal objects of the present invention are to improve the construction and mode of operation of spare tire covers and to produce a cover which will avoid the above disadvantages of the ordinary tire cover and which may be quickly and easily applied to or removed from a tire.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing—

Fig. 1 is a view in front elevation illustrating a spare tire cover embodying the present invention;

Fig. 2 is a sectional view taken substantially on the line 2—2 of Fig. 1.

The present invention embodies a cover made of sheet material formed into the proper shape to constitute a protective covering for the tire. The cover is made of material which is sufficiently stiff to maintain its shape without any inside support, but should have sufficient resiliency to enable the cover to be expanded and contracted in applying the same to and removing the same from a tire.

In the construction shown in Figs. 1 and 2, the invention is shown as applied to a tire 2 mounted on a rim 3 supported on a tire carrier. The tire carrier shown in dotted lines in Figs. 1 and 2 is preferably constructed so as to fit within the rim and leave the entire periphery of the tire free and unobstructed.

In the construction shown in Figs. 1 and 2, the tire cover comprises a cover member 6 arranged to cover the outer side of the tire, or that side farther from the automobile, and a cover member 8 arranged to surround and cover the periphery of the tire. The cover member 6 preferably consists of sheet material sufficiently stiff to maintain its shape without any inside support, such as molded rubber, and is preferably shaped so as to conform generally to the outside contour of the tire, as shown in Fig. 2. As clearly shown in this figure, the outer margin of the cover member 6 is extended so as to overlap the peripheral or tread portion of the tire. The inner margin of the cover member in this form of the invention terminates adjacent the margin of the rim 3.

The cover member 8 consists of a ring surrounding the periphery of the tire and overlapping the margin of the cover member 6 on the outside of the same, as shown in Fig. 2. The cover member 8 is provided along each margin with portions 10 turned back upon the body of the cover member to form rounded edges which will not injure the operator in applying said member to and removing the same from a tire.

In order that the cover member 8 may be expanded and contracted in applying the same to and removing the same from a tire, this member is made in the form of a split ring, the end portions 12 and 14 of which overlap each other in telescoping relation, as shown clearly in Fig. 1. The ring is preferably made of sheet metal which has a certain degree of resiliency and is constructed so that it will normally assume an inside diameter somewhat less than the diameter of the periphery of the tire to which it is to be applied. Further as best shown in Fig. 2 the ring or split rim or tread-covering portion 8 is convex and of such curvature as to provide clearance between it and the tread prior to the tightening of it into secured engagement with the tire whereby it may accommodate itself to variations in sizes of the tires but still be readily brought into snug engagement with the tire.

In applying the tire cover to a tire, the cover member 6 is first placed in the position shown in Fig. 2 against the outer side of the tire with its margin overlapping the periphery of the tire. The cover member 8 is then expanded sufficiently to pass over the periphery of the tire and is applied to the tire with one margin outside of and overlapping the outer margin of the cover member 6. The cover member 8 is then contracted upon the periphery of the tire to hold the two parts of the tire cover securely in place. In expanding the cover member 8, the sliding movement of the end portions 12 and 14 with relation to each other permits the ready expansion of the ring. When the ring is released, the spring of the metal will contract the same upon the tire. The ring may be flexed inwardly beyond the point to which it is contracted by the spring of the metal to hold the cover securely upon the tire.

In order to hold the tire cover securely in place with relation to the tire, the cover member 8 is provided with fastening devices comprising a bolt indicated at 16 mounted in an opening in a bracket 18 secured to the cover member, the opening in the bracket being considerably larger than the shank of the bolt so that the bolt may be displaced from the position shown in full lines in Fig. 1 to the position shown in dotted lines in said figure. The head end of the bolt is arranged to be inserted in a slot in a bracket 20 secured to the end portion 12 of the cover member, the head of the bolt engaging a concavely-formed surface formed on the bracket. The bolt 16 is provided with a wing nut 22 arranged to be manipulated by the operator in applying the tire cover to the tire and in detaching the cover therefrom. The projecting portion of the bracket 18 is preferably curved substantially as shown in Fig. 1 to permit the ready swinging movement of the bolt.

When the two cover members have been applied to the tire in the manner above described, the bolt 16 then occupying the dotted line position shown in Fig. 1, the bolt is swung upwardly to engage the same in the slot in the bracket 20 and the wing nut 22 is then turned to draw together brackets 18 and 20 and thereby cause relative movement of the end portions 12 and 14 of the cover member 8 in a direction to contract said member upon the tire. When it is desired to detach the cover from the tire, the thumb nut 22 is partially unscrewed from the bolt by the operator so that the head of the bolt may be released from the slot in the bracket 20. This enables the cover member 8 to be expanded sufficiently to pass transversely over the peripheral portion of the tire and the removal of the cover member 8 releases the cover member 6.

Having explained the nature and object of the invention, and having specifically described constructions embodying the invention, what is claimed is:

1. A multi-portion tire cover including a side plate portion of circular form for covering a side of the tire, a split rim portion associated therewith formed to extend about the outer periphery of the tire and extending from said side plate portion over substantially the entire width of the tread leaving the other and rear side of the tire exposed when the complete tire cover is thereon, said rim portion having a convex curvature of relatively shorter radius than that of the curvature of the tire tread so as to provide clearance between that portion and the tread when the rim portion is in position and prior to the tightening of the rim portion into secured engagement with the tire and means connecting the adjacent ends of said rim portion to draw them toward each other for securing the cover on the tire.

2. In a tire cover, a split circular rim formed to extend about substantially only the tread portion of the tire, said rim being convex and of such curvature as to provide clearance between the rim and tire tread when the rim is in contact with the tire and prior to the tightening of the rim into secured engagement with the tire and means connecting the ends of said rim to draw them toward each other for securing the rim on the tire in proper tire protecting position.

3. In a tire cover, a resiliently expansible and contractible split rim for covering substantially only the tread of a spare tire, and to fit spare tires of various shapes and diameters and providing clearance at the tread when the sides of the rim are in engagement with the tire before the connecting means become operative and formed from relatively stiff sheet material, said split rim being of such circumferential length and cross-sectional shape as to enable it to be shoved over the tread and to embrace the tire for holding engagement therewith, and means connecting the ends of said split rim together and substantially medially located to secure the same in proper tire protecting position on the tire.

4. A non-collapsible relatively rigid tire cover for spare tires comprising a side part to substantially cover the outer side wall of the tire and a tread-covering part extending from said side part across the tread of the tire provided with expansible and contractible means whereby said tread part is brought into holding engagement with the tire, said tread-covering part being convex and of such curvature as to provide clearance between that part of the tread when the tread-covering part is in contact with the tire and prior to the tightening of that part into secured engagement with the tire, and means for tightening the cover on the tire by drawing the ends of the tread-covering part together to secure the same in proper tire protecting position thereon.

5. A non-collapsible relatively rigid tire cover for spare tires comprising a side part to substantially cover the outer side wall of the tire and a tread-covering part extending from said side part across the tread of the tire provided with expansible and contractible means whereby said tread part is brought into holding engagement with the tire, said tread-covering part being convex and of such curvature as to provide clearance between that part and the tread when the tread-covering part is in contact with the tire and prior to the tightening of that part into secured engagement with the tire, and means for tightening the cover on the tire by drawing the ends of the tread-covering part together to secure the same in proper tire protecting position thereon, said side part being of such transverse curvature as to center itself substantially in place on the tire.

6. A non-collapsible relatively rigid tire cover for spare tires comprising a side part to substantially cover the outer side wall of the tire and a tread-covering part extending from said part across the tread of the tire provided with expansible and contractible means whereby said tread part is brought into holding engagement with the tire, said tread-covering part being convex and of such curvature as to provide clearance between that part and the tread when the tread-covering part is in contact with the tire and prior to the tightening of that part into secured engagement with the tire, and means for tightening the cover on the tire by drawing the ends of the tread-covering part together to apply cover holding pressure and so as to secure the cover in proper tire protecting position thereon, said side part having a laterally extending marginal portion for overlying a part of the tread and for cooperation with said tread-covering part.

7. A non-collapsible relatively rigid tire cover for spare tires, comprising a side portion to substantially cover the outer side wall of the tire, and a split tread-covering portion extending from said side portion over the tread of the tire and of relatively shallow depth so as to leave the rear side of the tire exposed and whereby it may be expanded over the tread of the tire, said tread-covering portion having an inwardly extending tire contacting part and being convex and of such curvature so as to provide clearance between that portion and the tread when the tread portion is in contact with the tire prior to the tightening of the tread-covering portion into secured engagement with the tire, and manually operative means for tightening the cover on the tire by forcibly drawing the ends of the tread portion into holding engagement with the tire to secure the cover in proper tire protecting position.

Signed at New York, N. Y., this 8th day of October, 1928.

GEORGE ALBERT LYON.